(12) United States Patent
Barger et al.

(10) Patent No.: US 7,267,728 B2
(45) Date of Patent: *Sep. 11, 2007

(54) SYSTEM AND METHOD FOR CLEANING AND/OR TREATING VEHICLES AND THE SURFACES OF OTHER OBJECTS

(75) Inventors: Bruce Barger, West Chester, OH (US); Thomas Geroge Crowe, Lawrenceburg, IN (US); Robert Henry Rohrbaugh, Hamilton, OH (US); Alan Scott Goldstein, Blue Ash, OH (US); Michael Ray McDonald, Middletown, OH (US); Helen Frances O'Connor, Loveland, OH (US); Morgan Thomas Leahy, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/022,027

(22) Filed: Dec. 13, 2001

(65) Prior Publication Data

US 2002/0160224 A1 Oct. 31, 2002

Related U.S. Application Data

(63) Continuation-in-part of application No. 09/972,090, filed on Oct. 5, 2001, now Pat. No. 6,562,142, which is a continuation-in-part of application No. 09/950,757, filed on Sep. 11, 2001, now Pat. No. 6,846,512, which is a continuation-in-part of application No. 09/875,311, filed on Jun. 6, 2001, and a continuation-in-part of application No. 09/876,363, filed on Jun. 7, 2001, now abandoned, and a continuation-in-part of application No. 09/828,014, filed on Apr. 6, 2001, now abandoned.

(60) Provisional application No. 60/265,059, filed on Jan. 30, 2001.

(51) Int. Cl.
B08B 3/00 (2006.01)

(52) U.S. Cl. .................. 134/26; 134/2; 134/6; 134/26; 134/29; 134/34; 134/36; 134/42; 134/95.3; 134/123; 510/108; 510/189

(58) Field of Classification Search .................... 134/2, 134/6, 7, 26, 29, 34, 36, 40, 42, 95.3, 111, 134/123; 510/108, 189, 480, 495, 467, 435, 510/431, 436
See application file for complete search history.

(56) References Cited

U.S. PATENT DOCUMENTS

| | | | | |
|---|---|---|---|---|
| 3,464,631 A | * | 9/1969 | Lieffring et al. | 239/135 |
| 3,502,215 A | * | 3/1970 | Cahan | 210/167 |
| 3,658,590 A | * | 4/1972 | Huebner et al. | 134/32 |
| 4,591,449 A | | 5/1986 | Goedhart et al. | |
| 4,597,886 A | | 7/1986 | Goedhart et al. | |
| 5,429,867 A | | 7/1995 | McCarthy et al. | |
| 5,595,345 A | * | 1/1997 | Chura et al. | 239/312 |
| 5,759,980 A | * | 6/1998 | Russo et al. | 510/241 |
| 5,853,809 A | | 12/1998 | Campbell et al. | |
| 6,225,434 B1 | | 5/2001 | Sadvary et al. | |
| 6,369,019 B1 | * | 4/2002 | Gordon et al. | 510/421 |
| 6,569,261 B1 | | 5/2003 | Aubay et al. | |
| 2002/0046969 A1 | | 4/2002 | Bartsch et al. | |
| 2002/0108640 A1 | | 8/2002 | Berger et al. | |

FOREIGN PATENT DOCUMENTS

| | | |
|---|---|---|
| EP | 368101 | 5/1990 |
| GB | 1 376379 | 12/1974 |
| GB | 2 303373 A | 2/1997 |
| JP | 57-028174 A | 6/1980 |
| JP | 03-169540 | 7/1991 |
| JP | 04-353438 | 12/1992 |
| JP | 96053558 A | 2/1996 |
| JP | 10-120948 | 12/1998 |
| WO | WO-97/48927 * | 6/1997 |
| WO | WO97/48927 * | 12/1997 |
| WO | WO98/01223 * | 1/1998 |
| WO | WO98/36046 * | 8/1998 |
| WO | WO99/00457 A1 | 1/1999 |

| WO | WO99/20724 | * | 4/1999 |
| --- | --- | --- | --- |
| WO | WO 00/00554 A1 | | 1/2000 |
| WO | WO01/05920 | * | 1/2001 |
| WO | WO 01/05920 A1 | | 1/2001 |
| WO | WO 01/27236 A1 | | 4/2001 |
| WO | WO 01/32820 A1 | | 5/2001 |

OTHER PUBLICATIONS

Laporte Industries, Inc. , Date of publication unknown but may before date of application, Leicestershire, U.K.

* cited by examiner

*Primary Examiner*—Michael Barr
*Assistant Examiner*—Jason P. Riggleman
(74) *Attorney, Agent, or Firm*—Jeffrey V. Bamber; Mark A. Charles; Laura R. Grunzinger

(57) ABSTRACT

The present invention relates to a system and method for cleaning and/or treating a surface, preferably surfaces such as ceramic, steel, plastic, glass and/or painted surfaces such as the exterior surface of a vehicle. The system and method utilize a cleaning composition that contains at least one water-soluble or water dispersible copolymer. The method may also include a step of applying to the surface a treating composition which contains non-photoactive nanoparticles.

8 Claims, 6 Drawing Sheets

US 7,267,728 B2

SYSTEM AND METHOD FOR CLEANING AND/OR TREATING VEHICLES AND THE SURFACES OF OTHER OBJECTS

CROSS REFERENCE TO RELATED PATENT APPLICATIONS

This application is a continuation-in-part of U.S. patent application Ser. No. 09/972,090 filed on Oct. 5, 2001 now U.S. Pat. No. 6,562,142, which is a continuation-in-part of U.S. patent application Ser. No. 09/950,757 filed on Sep. 11, 2001 now U.S. Pat. No. 6,846,512, which is a continuation-in-part of U.S. patent application Ser. No. 09/875,311, filed on Jun. 6, 2001, which claims the benefit of the filing date of PCT international patent application US00/16349 filed on Jun. 14, 2000; and a continuation-in-part of application Ser. No. 09/876,363, filed on Jun. 7, 2001, now abandoned, which claims the benefit of the filing date of provisional U.S. patent application 60/265,059, filed on Jan. 30, 2001; and a continuation-in-part of U.S. patent application Ser. No. 09/828,014 filed on Apr. 6, 2001, now abandoned.

FIELD OF THE INVENTION

The present invention relates to a system and method for cleaning and/or treating surfaces, including surfaces such as ceramic, steel, plastic, glass and/or painted surfaces such as the exterior surface of a vehicle.

BACKGROUND OF THE INVENTION

Products for cleaning hard surfaces are widely available on the market. These products are used for two purposes, the first being to clean soil from the surface and the second being to leave the surface with an aesthetically pleasing finish e.g. spot-free or shiny. However, products available on the market often require rinsing with water after use. Typically when the water dries from the surface water-marks, smears or spots are left behind. These water-marks, it is believed may be due to the evaporation of water from the surface leaving behind deposits of minerals which were present as dissolved solids in the water, for example calcium, magnesium and sodium ions and salts thereof or may be deposits of water-carried soils, or even remnants from a cleaning product, for example soap scum. This problem is often exacerbated by some cleaning compositions which modify the surface during the cleaning process in such a way that after rinsing, water forms discrete droplets or beads on the surface instead of draining off. These droplets or beads dry to leave consumer noticeable spots or marks known as water-marks. This problem is particularly apparent when cleaning ceramic, steel, plastic, glass or painted surfaces. A means of solving this problem, known in the art is to dry the water from the surface using a cloth or chamois before the water-marks form. However, this drying process is time consuming and requires considerable physical effort.

U.S. Pat. No. 5,759,980 (Blue Coral) describes a composition for cleaning cars which is described to eliminate the problem of water-marks. The composition described comprises a surfactant package comprising a silicone-based surfactant and a polymer which is capable of bonding to a surface to make it hydrophilic. However, it is believed that the polymers described in this document may tend to be removed from the surface during rinsing of the product from the surface. Hence since the surface hydrophilicity is allegedly provided by the composition as described in the patent and the composition may be removed from the surface after the first rinse, the alleged hydrophilicity is also removed. The result is that the benefit provided by the composition is lost when the surface is rinsed.

PCT Publication WO 97/48927 is directed to a cleaning composition, method, and apparatus for cleaning exterior windows. This publication states that it discloses a no scrub/no wipe method for cleaning exterior windows without filming or spotting. A spray gun comprising separate chambers for a cleaning composition and an ion exchange resin is disclosed. The method involves spraying a cleaning composition on the window surface, preparing purified rinse water by passing the rinse water through the ion exchange resin and rinsing the window surface with the purified rinse water.

In addition to cleaning such surfaces, it is desirable to leave these surfaces with a clean finish that lasts for a reasonable period of time. Even though such surfaces are left with a spot-free finish, when the surfaces are contacted with water, such as rainwater, in the case of surfaces exposed to outside elements, or tap water for interior surfaces, these surfaces quickly lose their spot-free finish due to the same factors that cause spotting (dirt, deposits of minerals which were present as dissolved solids in the water, and the like) when the surfaces are originally cleaned. There are a number of waxes and other products in the market for attempting to retain this spot-free finish. Typically, these products are designed to hydrophobically modify these surfaces so that rain water and tap water will bead up on such surfaces. However, it is believed that the beading of water on such surfaces may actually increase the formation of water spots since the beads of water will leave deposits on the surface when they dry.

Thus, there is a need to provide a process of cleaning a surface without the appearance of water-marks, even after the treated surface is later contacted with water.

SUMMARY OF THE INVENTION

The present invention relates to a system and method for cleaning and/or treating surfaces, including, but not limited to surfaces such as ceramic, steel, plastic, glass and/or painted surfaces such as the exterior surface of a vehicle.

There are numerous embodiments of the system and method, all of which are intended to be non-limiting examples of the system and method of the present invention. In some embodiments, the method may comprise a step of cleaning the surface prior to coating or treating the surface. If a cleaning composition is applied, it may (or may not) be agitated to loosen any dirt on the surface. In embodiments of the method that employ a cleaning composition, the cleaning composition may comprise a polymer that modifies the surface by rendering it hydrophilic. After the cleaning composition is applied, it may be, and often is, desirable to rinse the surface.

In some embodiments, it is desirable to at least partially remove at least some, and desirably, as many as possible, of any residue-forming substances on the surface before applying a coating or treating composition to the surface. This can be done in a non-limiting number of manners, including by drying the surface, or by rinsing the surface with water that has been purified, at least to some extent. If desired, a polymer capable of rendering the surface hydrophilic can be included in any, or all, of the rinsing operations.

A treating composition can be applied to the surface. The treating composition can comprise a substance that modifies the surface by rendering it hydrophilic. In one non-limiting embodiment, the substance can comprise a polymer that modifies the surface by rendering it hydrophilic. Any of the polymers used in these steps may be the same polymer, or different polymers. In another non-limiting embodiment, the treating composition can comprise non-photoactive nanoparticles and optionally, but preferably, a wetting agent. In some embodiments, it is desirable to allow the treating composition to dry before it is contacted with water.

The present invention is not limited to methods for both cleaning and treating such surfaces. For instance, in another non-limiting example, the method can comprise only the steps of treating the surface, if desired. Treating the surface preferably results in the formation of a generally uniform, transparent, hydrophilic coating on the surface. Any portions of the method described herein may comprise inventions in their own right without regard to the other steps described herein. The present invention may also include a cleaning composition, a coating composition, and a surface coated with such a coating composition.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE INVENTION

I. Introduction.

The present invention relates to a system and method for cleaning and/or treating surfaces, preferably surfaces such as ceramic, steel, plastic, glass and/or painted surfaces such as the exterior surface of a vehicle.

The term "surface" includes those surfaces typically found in houses like kitchens and bathrooms, e.g., floors, walls, tiles, windows, sinks, baths, showers, toilets, fixtures and fittings made of different materials like ceramic, porcelain, enamel, and vinyl, no-wax vinyl, linoleum, melamine, glass, any plastics, plastified wood, metal, especially steel and chrome metal, varnished or sealed surfaces and especially, the exterior surfaces of a vehicle, e.g. painted, plastic or glass surfaces and finishing coats.

II. The Kit.

Figure 1:
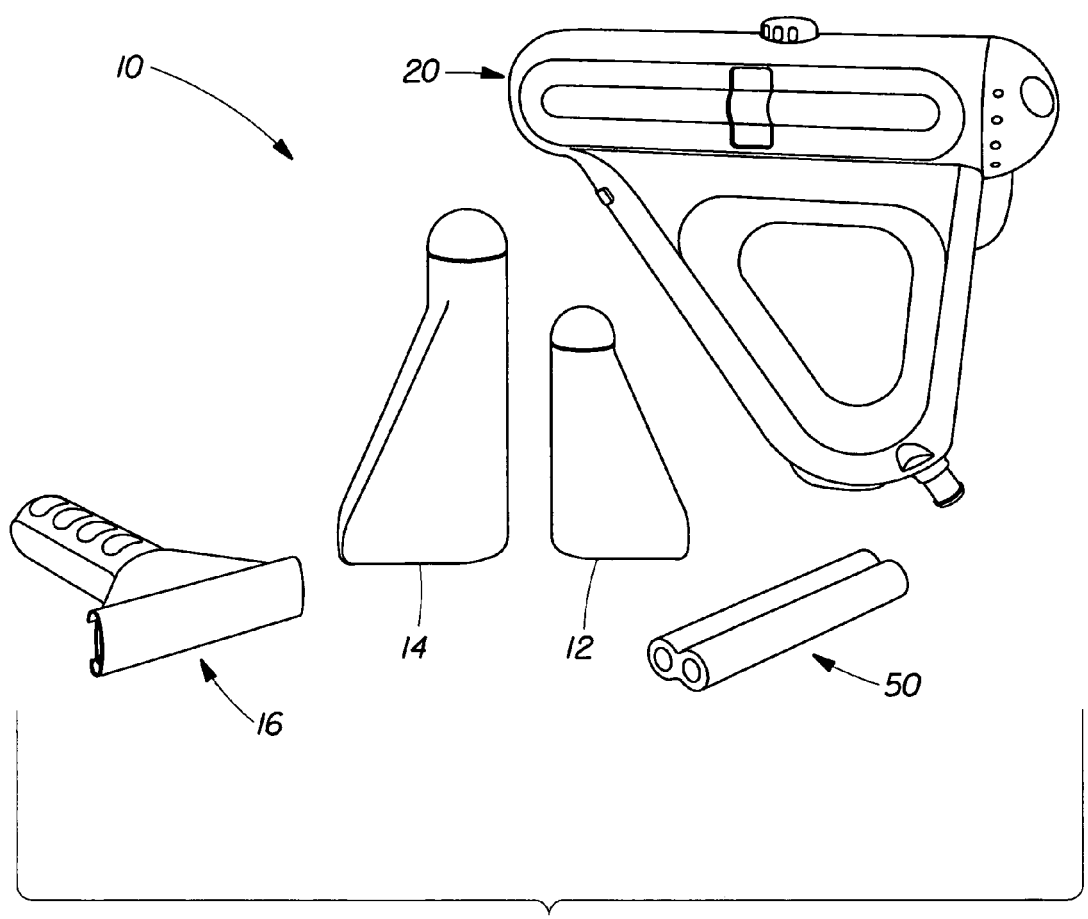
FIG. 1 is a perspective view of one non-limiting embodiment of the components of a kit for carrying out the method of the present invention.

FIG. 1 shows one non-limiting embodiment of a kit 10 for carrying out the method of the present invention. As shown in FIG. 1, the components of the kit 10 may comprise: a bottle of cleaning composition 12, a bottle of treating composition (which also may be referred to as a "finishing composition" or "coating composition") 14, an applicator 16, a spray device 20, and a filter 50 for the spray device. It should be understood that the components of the kit 10 shown in FIG. 1 are only one example of such a kit, and other kits could comprise fewer, or more components, or different components. For instance, in another non-limiting example, instead of being a squeegee as shown in FIG. 1, the applicator 16 could be a sponge, a rag, a cloth, a spray device, or other type of applicator.

A. The Cleaning Composition.

The cleaning composition can be any suitable composition that is capable of cleaning the surface in issue. Preferably, the cleaning composition leaves the surface as free from residue as possible. In certain preferred embodiments, the cleaning composition is capable of rendering the surface hydrophilic. By the term "hydrophilic", it is meant that the surface has an affinity for water. Because of the affinity between water and the surface, water spreads out on the surface to maximize contact. The higher the hydrophilicity, the greater the spread and the smaller the contact angle. Hydrophilicity can be determined by measuring the contact angle between the surface and a droplet of water on the surface. Contact angle is measured according to the American Standard Test Method for measuring contact angle, designation number D5725-95 using the apparatus commercially sold under the trade name Contact Angle Measuring System G10 by Kruss USA, Charlotte, N.C., USA.

In a preferred embodiment of the present invention, the surface after treatment with the cleaning composition has a contact angle of less than or equal to about 80°, or a contact angle less than, or less than or equal to, any number of degrees less than 80° (all of which numbers are incorporated herein even though not specifically listed herein, for example, 50°, 40°, 35°, 30°, 20°, etc.) with the lower contact angles being more preferred.

In one non-limiting embodiment, the cleaning composition comprises a polymer which is capable of rendering the surface cleaned hydrophilic. The polymer may be a "surface substantive polymer" meaning that it is capable of modifying the surface by adhering or in some way associating with the surface to be cleaned such that it preferably remains on the surface during and after the cleaning process. Such adhesion or association may be for example by: covalent interaction; electrostatic interaction; hydrogen bonding; or van der waals forces. The polymer modifies the surface by rendering it hydrophilic. In a preferred version of such an embodiment, the polymer is preferably also capable of semi-durably modifying the surface to render it hydrophilic. By "semi-durably" it is meant that the hydrophilic surface modification is maintained for at least one rinse with water.

The polymer used in these embodiments of the cleaning composition may be a homo or copolymer. In one embodiment, the polymer comprises at least one hydrophobic or cationic moiety and at least one hydrophilic moiety. The hydrophobic moiety may include, but is not limited to an aromatic, $C_{8-18}$ linear or branched carbon chain, vinyl imidazole or a propoxy group. Cationic moieties include any group that is positively charged or has a positive dipole. The hydrophilic moiety may be selected from any moiety that forms a dipole which is capable of hydrogen bonding. Suitable examples of such hydrophilic moieties include vinyl pyrrolidone, carboxylic acid, such as acrylic acid, methacrylic acid, maleic acid, and ethoxy groups.

In certain non-limiting embodiments of the invention, water soluble or water dispersible polymers are used in the cleaning composition to hydrophilically modify the surface. Water soluble polymers and copolymers may include those in which at least one segment or group of the polymer comprises functionality that serves to modify or enhance the hydrophilicity of the polymer or the adsorption of the polymer to the surface. Examples of the hydrophilizing segments or groups include: water soluble polyethers; water soluble polyhydroxylated groups or polymers, including saccharides and polysaccharides; water soluble carboxylates and polycarboxylates; water soluble anionic groups such as carboxylates, sulfonates, sulfates, phosphates, phosphonates and polymers thereof; water soluble amines, quaternaries, amine oxides, pyrrolidone, and polymers thereof; water soluble zwitterionic groups and polymers thereof; water soluble amides and polyamides; and water soluble polymers and copolymers of vinylimidazole and vinylpyrrolidone. Additionally, the water soluble polymer may include quaternized vinylpyrrolidone/dialkylaminoalkyl acrylate or methacrylate copolymers. Examples of the adsorption enhancing segment or group include but are not limited to the following: the segment or group of the polymer that comprises functionality that serves to modify or enhance the hydrophilicity, or segments or groups that include: aromatic, C8-18 linear or branched carbon chains, vinyl imidazole or a propoxy group, alkylene, and aryl groups, and polymeric aliphatic or aromatic hydrocarbons; fluorocarbons and polymers comprising fluorocarbons; silicones; hydrophobic polyethers such as poly(styrene oxide), poly(propylene oxide), poly(butene oxide), poly(tetramethylene oxide), and poly(dodecyl glycidyl ether); and hydrophobic polyesters such as polycaprolactone and poly(3-hydroxycarboxylic acids).

In certain non-limiting, but preferred embodiments, the polymer is selected from the group consisting of copolymers of polyvinyl pyrrolidone. A particularly preferred copolymer of polyvinyl pyrrolidone is N-vinylimidazole N-vinylpyrrolidone (PVPVI) polymers available from for example BASF under the trade name LUVITEC™ VP155K18P. Preferred PVPVI polymers have an average molecular weight of from about 1,000 to about 5,000,000, more preferably from about 5,000 to about 2,000,000, even more preferably from about 5,000 to about 500,000 and most preferably from about 5,000 to about 15,000. Preferred PVPVI polymers comprise at least about 55%, preferably at least about 60% N-vinylimidazole monomers. Alternatively, another suitable polymer may be a quaternized PVPVI, for example, the compound sold under the tradename LUVITEC™ Quat 73W by BASF.

Other suitable copolymers of vinylpyrrolidone for use in the cleaning composition are quaternized vinylpyrrolidone/dialkylaminoalkyl acrylate or methacrylate copolymers. The quaternized vinylpyrrolidone/dialkylaminoalkyl acrylate or methacrylate copolymers suitable for use in the cleaning composition have the following formula:

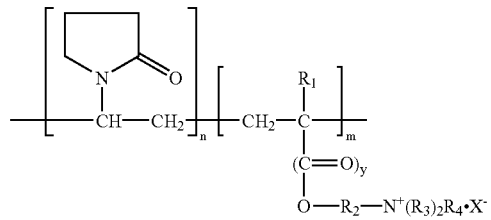

in which n is between 20 and 99 and preferably between 40 and 90 mol % and m is between 1 and 80 and preferably between 5 and 40 mol %; $R_1$ represents H or $CH_3$; y denotes 0 or 1; $R_2$ is —$CH_2$—CHOH—$CH_2$— or $C_xH_{2x}$, in which x=2 to 18; $R_3$ represents a lower alkyl group of from 1 to 4 carbon atoms, preferably methyl or ethyl, or

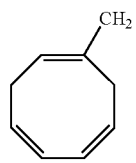

$R_4$ denotes a lower alkyl group of from 1 to 4 carbon atoms, preferably methyl or ethyl; $X^-$ is chosen from the group consisting of Cl, Br, I, $1/2SO_4$, $HSO_4$ and $CH_3SO_3$. The polymers can be prepared by the process described in French Pat. Nos. 2,077,143 and 2,393,573.

The preferred quaternized vinylpyrrolidone/dialkylaminoalkyl acrylate or methacrylate copolymers for use in the cleaning composition have a molecular weight of between about 1,000 and about 1,000,000, or any narrower range or amount that is included within the above range (including but not limited to between about 10,000 and about 500,000 and between about 10,000 and about 100,000). The average molecular weight range is determined by light scattering as described in Barth H. G. and Mays J. W. Chemical Analysis Vol 113, "Modem Methods of Polymer Characterization". Such vinylpyrrolidone/dialkylaminoalkyl acrylate or methacrylate copolymers are commercially available under the name copolymer 845®, GAFQUAT 734®, or GAFQUAT 755® from ISP Corporation, New York, N.Y. and Montreal, Canada or from BASF under the tradename LUVIQUAT®. Also preferred herein are quaternized copolymers of vinyl pyrrolidone and dimethyl aminoethymethacrylate (polyquaternium-11) available from BASF. Another preferred polymer is polyvinyl pyridine N-oxide (PVNO) polymer available from, for example Reilly. Preferred PVNO polymers have an average molecular weight of about 1,000 to about 2,000,000, more preferably from about 5,000 to about 500,000, most preferably from about 15,000 to about 50,000, or any narrower range or amount that is included within the above ranges (including but not limited to, up to about 40,000). The polymer is preferably present in the cleaning composition at a level of from about 0.001% to about 10% by weight of the cleaning composition, or any narrower range or amount within this range (including but not limited to between about 0.01% to about 5%, and between about 0.01% to about 1%).

In another non-limiting embodiment, the cleaning composition comprises at least one water-soluble or water-dispersible copolymer comprising, in the form of polymerized units:

(a) at least one monomer compound of general formula I:

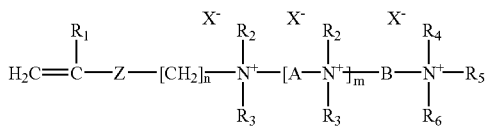

in which:

R₁ is a hydrogen atom or a methyl or ethyl group;

R₂, R₃, R₄, R₅ and R₆, which are identical or different, are linear or branched $C_1$-$C_6$, preferably $C_1$-$C_4$, alkyl, hydroxyalkyl or aminoalkyl groups;

m is an integer from 0 to 10, preferably from 0 to 2;

n is an integer from 1 to 6, preferably from 2 to 4;

Z represents a —C(O)O— or —C(O)NH— group or an oxygen atom;

A represents a $(CH_2)_p$ group, p being an integer from 1 to 6, preferably from 2 to 4;

B represents a linear or branched $C_2$-$C_{12}$, advantageously $C_3$-$C_6$, polymethylene chain optionally interrupted by one or more heteroatoms or heterogroups, in particular 0 or NH, and optionally substituted by one or more hydroxyl or amino groups, preferably hydroxyl groups;

X, which are identical or different, represent counterions;

(b) at least one hydrophilic monomer carrying a functional group with an acidic nature which is copolymerizable with (a) and which is capable of being ionized in the application medium;

(c) optionally at least one monomer compound with ethylenic unsaturation with a neutral charge which is copolymerizable with (a) and (b), preferably a hydrophilic monomer compound with ethylenic unsaturation with a neutral charge, carrying one or more hydrophilic groups, which is copolymerizable with (a) and (b).

The above polymer compound is described further in PCT Publication WO 01/05920 A1 filed by Rhodia Chimie on Jun. 19, 2000. The above polymer compound is obtained as proprietary polymer DV6573 from Rhodia Chimie, Courbevoie, Cedex, France, and can be present in the cleaning composition, or, if desired, in a rinse composition. An example of a suitable composition containing this polymer compound is provided in the Examples section of this specification.

The cleaning composition may comprise a variety of optional ingredients depending on the desired benefit and the type of surface to be cleaned. Suitable optional ingredients for use herein can be selected from the group comprising: anti-resoiling ingredients, surfactants, clay, chelating agents, enzymes, hydrotopes, ions, suds control agents, solvents, buffers, thickening agents, radical scavengers, soil suspending polymers, pigments, dyes, preservatives and/or perfumes. Suitable ingredients for the cleaning compositions, particularly surfactants therefor, are described in U.S. Pat. Nos. 5,888,955, 6,172,021, and 6,281,181. The cleaning composition may (or may not) include other ingredients, such as those specified below for the treating composition (including, but not limited to nanoparticles).

The cleaning composition may be in any form, for example, liquid, gel, foam, particulate or tablet. When the cleaning composition is a liquid, it may be aqueous or non-aqueous, dilute or concentrated. When the cleaning composition is aqueous, it preferably comprises from about 1% to about 99.9% water, more preferably from about 50% to about 99.8%, most preferably from about 80% to about 99.7% water. As mentioned, it is alternatively envisaged that the cleaning composition may be non-aqueous. By "non-aqueous", it is meant that the cleaning composition is substantially free from water. More precisely, it is meant that the cleaning composition does not contain any expressly added water and thus the only water that is present in the composition is present as water of crystallization for example in combination with a raw material. When the composition is in solid form, e.g. particulate or tablet, it is preferably dissolved in water prior to use.

The cleaning composition may have any suitable pH. In certain embodiments, it may be desirable for the cleaning composition to have a neutral pH, for example, a pH of between about 4-9.

B. The Spray Device.

Figure 2:
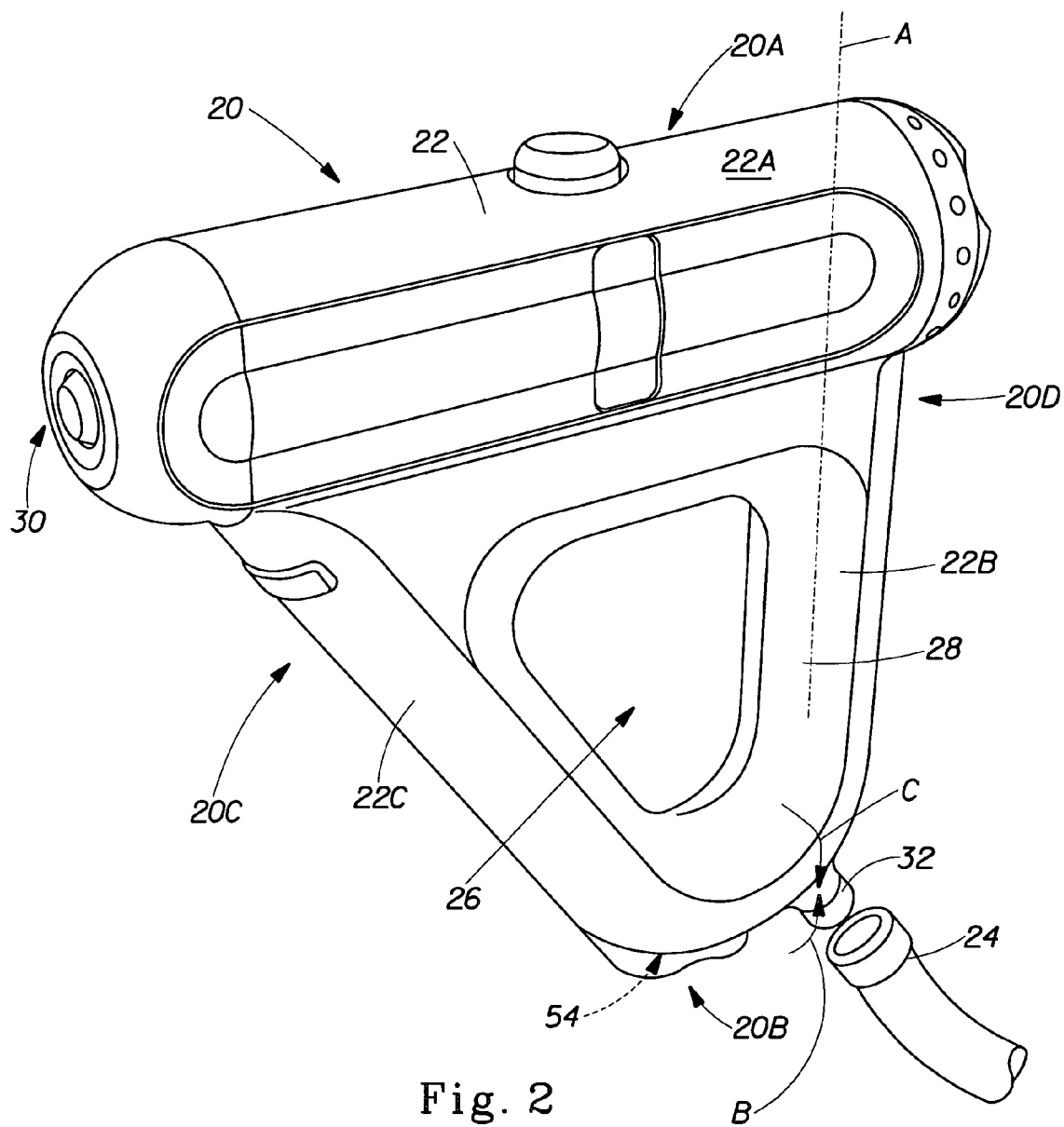
FIG. 2 is a perspective view of the sprayer shown in FIG. 1.

The spray device 20 can be in any suitable configuration. The spray device 20 may be hand held, or it may comprise at least a portion that is attached to or supported by the user's body or clothing (including, but not limited to the user's belt, or in the form of a backpack), or a portion of the device may rest on the ground, or on a mobile platform such as a cart. FIGS. 1 and 2 show one non-limiting embodiment of an ergonomically-designed, hand-held hose-end sprayer 20 that can be used in the system and method of the present invention. It should be understood that the system and method of the present invention are not limited to use with the embodiment of the sprayer shown in the drawings, and that many other types of sprayers, or other types of applicators, can be used.

In a preferred embodiment of the present invention, the cleaning composition is applied to the surface using a spray dispenser which is specifically designed to attach to a hose, for example, a conventional garden hose. Such spray dispensers are commonly referred to in the trade as Venturi or hose-end systems. The sprayer head includes an aperture over which water from the garden hose passes to mix with the cleaning composition from the container. In a preferred embodiment of the present process, the spray dispenser used encompasses a switch or valve system allowing the user to not only spray cleaning composition, but also spray water and/or purified rinse water to rinse the car. In a particularly preferred embodiment, the spray dispenser also comprises a purifying device, such as a filter. Water can, thus, be channeled though the purifying device to prepare the water for a final rinse of purified rinse water.

As shown in FIG. 1, this embodiment of the sprayer 20 has a generally triangular shape (and more particularly, a right triangular shape) when viewed from the side. FIG. 2 shows that the sprayer 20 has an upper portion 20A, an opposed lower portion 20B that is generally oriented toward the ground when the sprayer is in operation, a front portion 20C that is oriented toward the surface to be sprayed when the sprayer is in operation, and an opposed rear portion 20D.

The sprayer 20 comprises a housing or structure 22. The housing 22 has three portions: first portion 22A, second portion 22B, and third portion 22C that form the triangular shape. Preferably water flows through the housing 22 when the sprayer 20 is connected to a hose 24 and is in use. The housing 22 has a generally centrally located opening 26 and a handle 28 for gripping by a user. The handle has an axis, A. The sprayer further comprises at least one spray nozzle 30 that is operatively connected to the housing 22, and a hose connection (or simply "connection") 32 for the hose 24.

Figure 3:
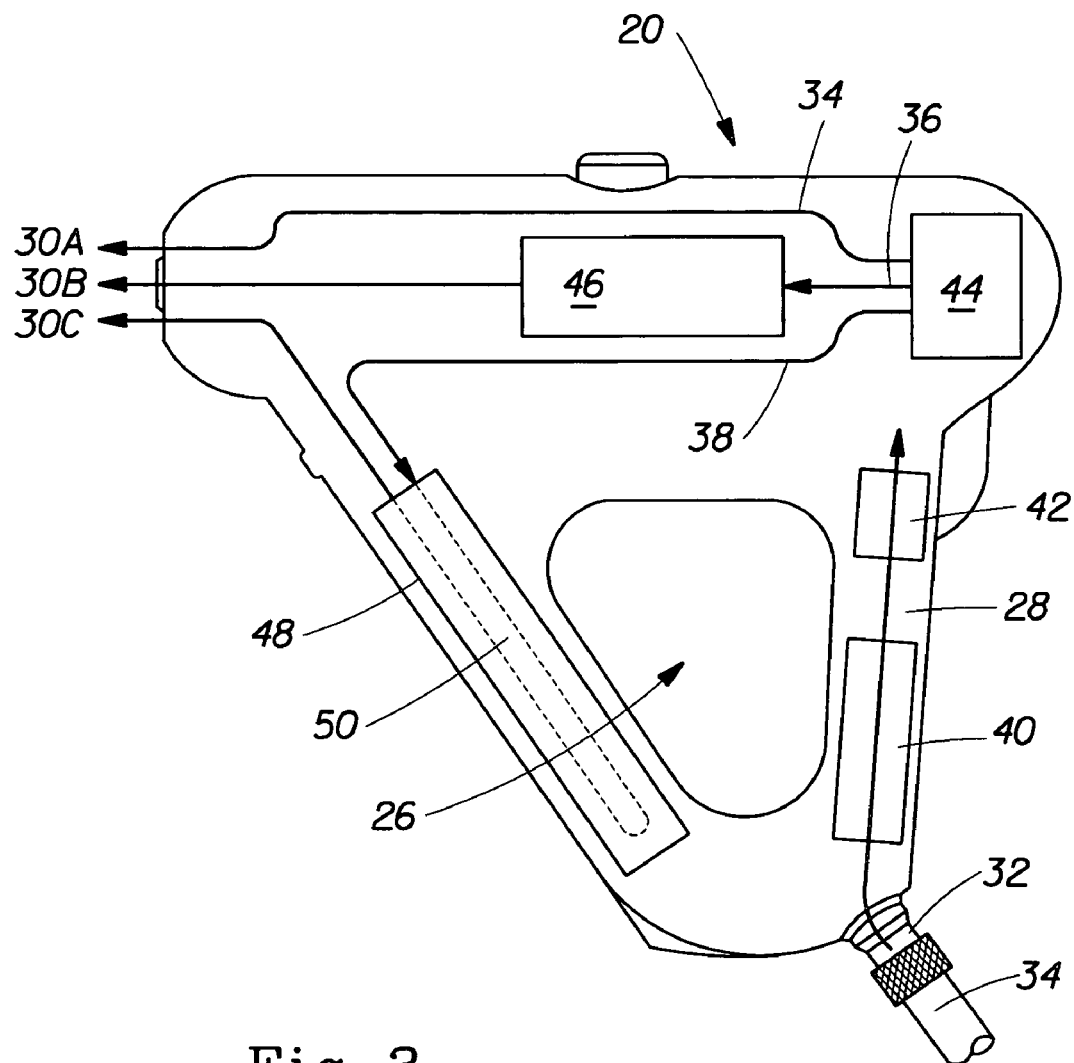
FIG. 3 is a schematic side view of the interior of the sprayer shown in FIG. 2.

FIG. 3 shows that in this embodiment, the sprayer 20 may also comprise one or more conduits (or flow channels or flow paths) through which water may flow. Preferably, in the embodiment shown, the sprayer housing 22 comprises three flow paths 34, 36, and 38. The sprayer 20 may also comprise a flow regulator 40, an on/off switch 42, a flow selector 44, a compartment 46 for a composition to be dispensed (such as the cleaning composition), a compartment 48 for a filter, and a filter 50. This embodiment of the sprayer 20 has three nozzles comprising first nozzle 30A, second nozzle 30B, and third nozzle 30C.

The flow selector of the sprayer 20 can have any suitable settings, and any suitable number of settings. For instance, in one non-limiting embodiment, the flow selector may have settings for one or more of the following: "wash", "normal rinse", "purified rinse", and "finish coat". Of course, the flow selector need not include all of these settings, and other suitable names can be used for any of these steps. The selector valve system comprises any system which allows the user to select different settings on the device. Preferably, the valve system is capable of facilitating the user's compliance with a defined wash and rinse process comprising at least a washing step, an unpurified water rinsing step and a purified water rinsing step.

As noted above, in other embodiments, other types of sprayers can be used instead of the sprayer described above. The spraying device may be manually or electrically powered. Manually operated spraying devices include trigger-operated spray dispenser or pump-operated spray dispenser. In still other embodiments, the sprayer could be an electrostatic sprayer. In these or other embodiments, additional sprayers can be used to carry out the method of the present invention. If more than one sprayer is used, the sprayers may be the same type of sprayer, or different types of sprayers. In still other embodiments, the method of the present invention can be carried without using a sprayer at all, and using some other type of application device instead, including but not limited to a sponge with soap in a bucket containing water.

Preferably, however, a sprayer is used. If a sprayer is used, one or more sprayers may be used to carry out one or more of the steps of: applying a cleaning solution to the surface of a vehicle; rinsing the surface of the vehicle to remove at least some of the cleaning solution; rinsing the surface of the vehicle with purifed rinse water; and, applying a treating composition to the surface of the vehicle. In one non-limiting embodiment, the sprayer described above is used for at least the steps of: applying a cleaning solution to the surface of a vehicle; rinsing the surface of the vehicle to remove at least some of the cleaning solution; and, rinsing the surface of the vehicle with purifed rinse water. In such an embodiment, a separate electric sprayer can be used to carry out the step of applying a treating composition to the surface of the vehicle.

1. The Filter/Ion Exchange Medium.

If a sprayer is used to provide purified rinse water, the sprayer may have a water purifier or filter that is used therewith. The filter can comprise any suitable type of filter, and any known filtering material. The filter can be permanent or replaceable. The filter can be in any suitable configuration. In one non-limiting embodiment, the filter can be of a type that is removeably attachable to the end of a garden hose. Preferably, however, in the embodiment of the kit 10 shown, the filter 50 is of a type that is incorporated into the sprayer 20. More specifically, the filter 50 is a replaceable filter that resides inside the third portion 22C of the housing. This filter 50 shown is a generally cylindrical filter, and more specifically is in the form of a structure comprised of two cylindrical portions that are joined together along their axes to form a compound cylindrical structure with a cross-section that resembles the figure "8". The filter 50 can be inserted into and removed from the sprayer housing 22 through an opening 54 in the lower portion 20B of the sprayer 20. In one non-limiting embodiment, the filter 50 comprises an ion exchange medium such as an ion exchange resin filter for removing dissolved Ca and Mg ions from the water.

In one embodiment of an ion exchange resin filter, the purifying material is a mixture of several ion exchange resins or most preferably layers of different ion exchange resins. The ion exchange resin is selected from the group of strong acid cation (SAC), strong base anion (SBA), weak acid cation (WAC) and weak base anion (WBA) ion exchange resins. Strong acid or strong base ion exchange resins are those which comprise a strong acid or base functionality. A strong acid or strong base functionality are those which have a pKa or pKb, respectively, of higher than 2.5. A weak acid or base functionality is defined by a pKa or pKb, respectively, of less than 2.5. The purifying device may preferably comprise a random mixture of strong acidic and strong basic ion exchange resins. However, in one especially preferred embodiment, the purifying device comprises a sequential bed design of three different ion exchange resins, namely weak acidic, strong acid and weak basic and even more preferably in that order.

By "SAC ion exchange resin", it is meant a resin that filters all cations including calcium, magnesium and sodium. Examples of SAC ion exchange resins include, but are not limited to Rohm and Haas IRN77, 1500H and Purlite C100H. By "SBA ion exchange resin", it is meant a resin that filters all anions including sulfate, chloride, carbonate, bicarbonate and silicate. Examples of SBA ion exchange resins include, but are not limited to Rohm and Haas 4400OH and Purlite A400OH. By "WAC ion exchange resin", it is meant a resin that selectively filters the hardness ion and other multi-valent and mono-valent cations associated with alkalinity. Examples of WAC ion exchange resins include, but are not limited to Rohm and Haas IRC86 and Purlite C104. By "WBA ion exchange resin", it is meant a resin that selectively filters strong acid anions such as sulfate and chloride. Examples of WBA ion exchange resins include, but are not limited to Rohm and Haas IRA67 and Purlite A830.

In a preferred embodiment, small particle size resin beads are used for higher ion exchange efficiency. By "small particle size resin beads", it is preferably meant beads of less than 1.0 mm in diameter, more preferably less than 0.6 mm and most preferably less than 0.4 mm in diameter. It is believed that small particle size resin beads provide improved efficiency due to the faster ion exchange kinetics of the smaller particle size resins. The faster kinetics results in greater utilization of the ion exchange capacity. In one non-limiting embodiment, the filter has a volume capacity of no greater than 100 in$^3$ and is suitable for use in a hand-held device. In other non-limiting embodiments, the filter has a volume capacity of at least 4 in$^3$, more preferably at least 6 most preferably at least 8 in$^3$.

The purifying device preferably also comprises a visual indicator of depletion of purifying capacity. In a preferred embodiment, at least one type of resin in the purifying device provides the visual indicator. In a particularly preferred embodiment, the visual indicator is provided by a change in color of a resin. Indicators generally used for acid/base titration can also be used to indicate the depletion of resin exchange capacity. Since many indicators themselves are ionic in nature, ion resins can be prepared in indicator form by treating them with 0.1% solution of the indicator in 95% ethanol. Typical indicators used include phenolphthalein, thymol blue and bromocresol green. The mechanism of the indicator color change on the resin is basically the same as the mechanism in a solution during an acid/base titration. The water trapped in the SAC matrix, for example, is very acidic by nature because of the hydrogen ions. As the hydrogen ions gets exchanged out, the pH slowly rises. Eventually this pH change triggers the color change. Thymol blue, for example, has a transition range between pH 1.2-2.8. Commercially available resins that change color upon exhaustion include Purolite MB400IND (blue regenerated, amber exhausted) and MB400QR (colorless regenerated, red exhausted). Many resin manufacturers will also dye the resins upon request for specific applications.

C. The Treating (Finishing/Coating) Composition.

The treating (or finishing or coating) composition comprises a hard surface coating composition comprising a plurality of non-photoactive nanoparticles. The treating composition may be referred to as a finishing composition since it may be the last substance that is applied to the surface. It may also be referred to as a coating composition since it may be applied by coating the surface. Such a coating composition may comprise: (a) an effective amount of non-photoactive nanoparticles; (b) one or more surfactants; (c) optionally one or more adjunct ingredients; and (d) optionally a suitable carrier medium. The coating composition is preferably aqueous, and is substantially free from pigments and opacifiers, and no masking is applied to non-painted surfaces of the vehicles to which it is applied. It should be understood, however, that the coating composition is not limited to coating compositions that contain the ingredients listed above, and that suitable coating compositions may omit some of these ingredients, or contain additional ingredients (such as photoactive nanoparticles).

1. The Non-Photoactive Nanoparticles.

Nanoparticles, defined as particles with diameters of about 400 nm or less, are technologically significant, since they are utilized to fabricate structures, coatings, and devices that have novel and useful properties due to the very small dimensions of their particulate constituents. "Non-photoactive" nanoparticles do not use UV or visible light to produce the desired effects. Nanoparticles can have many different particle shapes. Shapes of nanoparticles can include, but are not limited to spherical, parallelpiped-shaped, tube shaped, rod shaped, and disc or plate shaped.

Nanoparticles with particle sizes ranging from about 2 nm to about 400 nm can be economically produced. Particle size distributions of the nanoparticles may fall anywhere within the range from about 1 nm, or less, to less than about 400 nm, alternatively from about 2 nm to less than about 100 nm, and alternatively from about 2 nm to less than about 50 nm. For example, a layer synthetic silicate can have a mean particle size of about 25 nanometers while its particle size distribution can generally vary between about 10 nm to about 40 nm. Alternatively, nanoparticles can also include crystalline or amorphous particles with a particle size from about 1, or less, to about 100 nanometers, alternatively from about 2 to about 50 nanometers. Nanotubes or nanorods can include structures up to 1 centimeter long, alternatively with a particle size from about 1 nanometer, or less, to about 50 nanometers.

Inorganic nanoparticles generally exist as oxides, silicates, carbonates and hydroxides. Some layered clay minerals and inorganic metal oxides can be examples of nanoparticles. The layered clay minerals suitable for use in the coating composition include those in the geological classes of the smectites, the kaolins, the illites, the chlorites, the attapulgites and the mixed layer clays. Smectites include montmorillonite, bentonite, pyrophyllite, hectorite, saponite, sauconite, nontronite, talc, beidellite, volchonskoite and vermiculite. Kaolins include kaolinite, dickite, nacrite, antigorite, anauxite, halloysite, indellite and chrysotile. Illites include bravaisite, muscovite, paragonite, phlogopite and biotite. Chlorites include corrensite, penninite, donbassite, sudoite, pennine and clinochlore. Attapulgites include sepiolite and polygorskyte. Mixed layer clays include allevardite and vermiculitebiotite. Variants and isomorphic substitutions of these layered clay minerals offer unique applications.

The layered clay minerals suitable for use in the coating composition may be either naturally occurring or synthetic. An example of one embodiment of the coating composition uses natural or synthetic hectorites, montmorillonites and bentonites. Another embodiment uses the hectorites clays commercially available. Typical sources of commercial hectorites are LAPONITE™ from Southern Clay Products, Inc., U.S.A; Veegum Pro and Veegum F from R. T. Vanderbilt, U.S.A.; and the Barasyms, Macaloids and Propaloids from Baroid Division, National Read Comp., U.S.A.

The inorganic metal oxides used in the coating composition may be silica- or alumina-based nanoparticles that are naturally occurring or synthetic. Aluminum can be found in many naturally occurring sources, such as kaolinite and bauxite. The naturally occurring sources of alumina are processed by the Hall process or the Bayer process to yield the desired alumina type required. Various forms of alumina are commercially available in the form of Gibbsite, Diaspore, and Boehmite from manufacturers such as Condea.

Synthetic hectorites, such as LAPONITE™, do not contain any fluorine. An isomorphous substitution of the hydroxyl group with fluorine will produce synthetic clays referred to as sodium magnesium lithium fluorosilicates. These sodium magnesium lithium fluorosilicates, marketed as LAPONITE™ and LAPONITE S™, may contain fluoride ions of up to approximately 10% by weight. It should be understood that the fluoride ion content useful in the compositions described herein can comprise any whole or decimal numeric percentage between 0 and 10 or more. LAPONITE B™, a sodium magnesium lithium fluorosilicate, has a flat, circular plate-like shape, and may have a diameter with a mean particle size, depending on fluoride ion content, that is any number (or narrower set of numbers) that is within the range of between about 25-100 nanometers. For example, in one non-limiting embodiment, LAPONITE B™ may be between about 25-40 nanometers in diameter and about 1 nanometer in thickness. Another variant, called LAPONITE S™, contains about 6% of tetrasodium pyrophosphate as an additive. In some instances, LAPONITE B™ by itself is believed, without wishing to be bound to any particular theory, to be capable of providing a more uniform coating (that is, more continuous, i.e., less openings in the way the coating forms after drying), and can provide a more substantive (or durable) coating than some of the other grades of LAPONITE™ by themselves (such as LAPONITE RD™) The coating preferably forms at least one layer of nanoparticles on the surface which has been coated, and is substantially uniform.

The ratio of the largest dimension of a particle to the smallest dimension of a particle is known as the particle's aspect ratio. The aspect ratio of the nanoparticles, in some cases, is of interest in forming films with the desired characteristics. The average aspect ratio of individual particles of LAPONITE™ B is approximately 20-40 and the average aspect ratio of individual particles of LAPONITE™ RD is approximately 10-15. A high aspect ratio is desirable for film formation using nanosized clay materials. The aspect ratio of the dispersed particles in a suitable carrier medium, such as water is also of interest. The aspect ratio of the particles in a dispersed medium can be considered to be lower where several of the particles are aggregated than in the case of individual particles. The aspect ratio of dispersions can be adequately characterized by TEM (transmission electron microscopy). LAPONITE B™ occurs in dispersions as essentially single clay particles or stacks of two clay particles. The LAPONITE RD™ occurs essentially as stacks of two or more single clay particles. Thus, the aspect ratio of the particles dispersed in the carrier medium can be affected if there is an aggregation of individual particles. In certain non-limiting embodiments, it may be desirable for at least some of (and preferably a plurality of) individual (non-aggregated) platelet and disc-shaped non-photoactive nanoparticles to have at least one dimension that is greater than or equal to about 0.5 nanometers, and an aspect ratio of greater than or equal to about 15. The aspect ratio of LAPONITE B™ is about 20-40 and the aspect ratio of LAPONITE RD™ is less than 15. Larger aspect ratios are preferred for platelet and disc-shaped particles than for rod-shaped particles.

The aspect ratio of rod-shaped particles, such as small boemite alumina (e.g., Disperal P2™), can be lower than the disc-shaped or platelet-shaped particles while maintaining adequate film-forming properties. In certain non-limiting embodiments, it may be desirable for at least some of (and preferably a plurality of) the individual rod-shaped non-photoactive nanoparticles to have at least one dimension that is greater than or equal to about 0.5 nanometers, and an aspect ratio of greater than or equal to about 3.

LAPONITE™ has the formula:

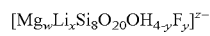

wherein w=3 to 6, x=0 to 3, y=0 to 4, z=12−2w−x, and the overall negative lattice charge is balanced by counter-ions; and wherein the counter-ions are selected from the group consisting of selected $Na^+$, $K^+$, $NH_4^+$, $Cs^+$, $Li^+$, $Mg^{++}$, $Ca^{++}$, $Ba^{++}$, $N(CH_3)_4^+$ and mixtures thereof.

In some preferred embodiments, the nanoparticles will have a net excess charge on one of their dimensions. For instance, flat plate-shaped nanoparticles may have a positive charge on their flat surfaces, and a negative charge on their edges. Alternatively, such flat plate-shaped nanoparticles may have a negative charge on their flat surfaces and a positive charge on their edges. Preferably, the nanoparticles have an overall net negative charge. This is believed to aid in hydroplilizing the surface coated with the nanoparticles. The amount of charge, or "charge density", on the nanoparticles can be measured in terms of the mole ratio of magnesium oxide to lithium oxide in the nanoparticles. In preferred embodiments, the nanoparticles have a mole ratio of magnesium oxide to lithium oxide of less than or equal to about 11%.

Depending upon the application, the use of variants and isomorphous substitutions of LAPONITE™ provides great flexibility in engineering the desired properties of the coating composition used in the present invention. The individual platelets of LAPONITE™ are negatively charged on their faces and possess a high concentration of surface bound water. When applied to a hard surface, the hard surface is hydrophilically modified and exhibits surprising and significantly improved wetting and sheeting, quick drying, uniform drying, anti-spotting, anti-soil deposition, cleaner appearance, enhanced gloss, enhanced color, minor surface defect repair, improved smoothness, anti-hazing properties, modification of surface friction, reduced damage to abrasion and improved transparency properties. In addition, the LAPONITE™ modified surface exhibits "self-cleaning" properties (dirt removal via water rinsing, e.g. from rainwater) and/or soil release benefits (top layers are strippable via mild mechanical action).

In contrast to hydrophilic modification with organic polymers, the benefits provided by nanoparticles, such as LAPONITE™, either alone or in combination with a charged modifier, are longer lived. For example, sheeting/anti-spotting benefits are maintained on an automobile body and glass window after multiple rinses versus the duration of such benefits after only about one rinse with tap water or rainwater on a surface coated with hydrophilic polymer technology.

2. The Surfactant.

Surfactants are especially useful in the coating composition as wetting agents to facilitate the dispersion of nanoparticles onto the surface. Surfactants are alternatively included when the coating composition is used to treat a hydrophobic hard surface or when the coating composition is applied with a spray dispenser in order to enhance the spray characteristics of the coating composition and allow the coating composition, including the nanoparticles, to distribute more evenly. The spreading of the coating composition can also allow it to dry faster, so that the treated surface is ready to use sooner. For concentrated compositions, the surfactant facilitates the dispersion of many adjunct ingredients such as antimicrobial actives and perfumes in the concentrated aqueous compositions. Suitable surfactants useful in the present invention are selected from the group comprising anionic surfactants, cationic surfactants, nonionic surfactants, amphoteric surfactants, zwitterionic surfactants, and mixtures thereof.

When a surfactant is used in the coating composition, it is added at an effective amount to provide one, or more of the benefits described herein, typically from about 0.01% to about 5%, alternatively from about 0.01% to about 3%, alternatively from about 0.01% to about 0.5%, by weight of the coating composition.

The surfactant can be formulated to be compatible with the nanoparticle system, the carrier medium, and optional adjunct ingredients present in the coating composition. The surfactant can also be chosen to more effectively spread the nanoparticle coating composition on the suface and provide the surface with the desired benefits. In certain embodiments, this may mean that the surfactant is selected so that the static surface tension of the liquid-vapor interface for a 0.1% surfactant solution containing the surfactant and the vapor above such a solution is less than about 32 dynes/cm, preferably less than or equal to about 30 dynes/cm. In these embodiments, the surfactant is also preferably selected such that the critical micelle concentration (CMC) of the surfactant is less than or equal to about 650 ppm.

For the coating compositions used herein, this may also mean that the surfactants are of type that (as opposed to detersive surfactants) are low sudsing and low foaming (since it is generally undesirable for the coating to have suds or foam therein). Low foaming nonionic surfactants can be described in terms of their cloud point. Low foaming nonionic surfactants typically have a cloud point below about 30° C. Non-limiting descriptions of low cloud point nonionic surfactants are contained in U.S. Pat. Nos. 6,013,613 and 6,034,044. It should be understood, however, that surfactants can be useful in the coating composition even if they have cloud points above about 30° C. Preferred surfactants may have a cloud point of 40° C. or less, although surfactants having higher cloud points are not excluded. Amphoteric and anionic surfactants can be considered to be low sudsing and low foaming if they exhibit a Kraft Temperature of below about 30° C.

Examples of some suitable nonionic, anionic, cationic, ampholytic, zwitterionic and semi-polar nonionic surfactants are disclosed in U.S. Pat. Nos. 5,707,950 and 5,576,282, incorporated herein by reference.

In one non-limiting embodiment, the surfactant system comprises a nonionic surfactant. One such surfactant suitable for use in the coating composition comprises polyethylene oxide and polypropylene oxide condensates of primary and secondary aliphatic alcohols. These compounds include the condensation products of primary and secondary aliphatic alcohols having an alkyl group containing from about 6 to about 14 carbon atoms, preferably from about 8 to about 14 carbon atoms, in either a straight-chain or branched-chain configuration with the alkylene oxide. In a preferred embodiment, the nonionic surfactant is comprised of units of ethylene oxide and units of propylene oxide where amount of ethylene oxide is equal to from about 2 to about 25 moles, more preferably from about 3 to about 15 moles, of ethylene oxide per mole of primary and secondary aliphatic alcohol and the propylene oxide is equal to from about 2 to about 25 moles, more preferably from about 3 to about 15 moles, of propylene oxide per mole of primary and secondary aliphatic alcohols. Commercially available nonionic surfactants of this type include nonionic surfactants in the TERGITOL™ series, such as MIN-FOAM 1X™, an alkyloxy (polyethyleneoxypropylenoxy) isopropanol having the formula $C12\text{-}14H25\text{-}29O(CH2CH2O)x\{CH2CH2O/CH2CH(CH3)O\}yCH2CH(CH3)OH$ and MINFOAM 2X™ available from Union Carbide Corporation, a subsidiary of The Dow Chemical Company, Danbury, Conn., USA.

In other embodiments, the surfactants that are useful in the formulation of the coating compositions of the present invention are silicone surfactants, also known as silicone superwetting agents. Any of the types of surfactants described herein could be combined with any of the other types of surfactants.

3. Suitable Carrier Medium

The carrier medium can form part of the coating composition, or it can comprise the medium in which the nanoparticles are carried (or transported) for application to the surface.

Several non-limiting examples of types of carrier mediums are provided by way of explanation, and not by way of limitation. In one example, the coating composition can be provided in the form of an aqueous liquid in a container, and the liquid can be sprayed onto the surface. In such a case, the aqueous liquid carrier in the container holding the coating composition may be referred to herein as the "static carrier". When this coating composition is sprayed onto the surface, the liquid droplets in the spray may be referred to herein as the "dynamic carrier" (the medium that transports the nanoparticles to the surface in order to contact the surface). In another example, the coating composition may exist in a gel form in a container (the gel would be the form of the static carrier) and the gel could be diluted with water and sprayed as a liquid onto the surface (in which case the liquid spray would be the dynamic carrier). The term "carrier", as used herein, includes both static and dynamic carriers.

Suitable carrier mediums include liquids, solids and gases. One suitable carrier medium is water, which can be softened (Ca and Mg ions removed), distilled, deionized, or tap water. Water is valuable due to its low cost, availability, safety, and compatibility. In certain embodiments in which the carrier medium is aqueous, it may be preferred that at least some of the aqueous carrier is purified beyond the treatment it received to convert it to tap water (that is, the tap water is post-treated, e.g., deionized, distilled, or softened). The purified water could comprise: all or part of the static carrier for the composition; all or part of the dynamic carrier; or, all or part of both. Other suitable carrier media include, but are not limited to solvents, including, but not limited to alcohol, methanol, isopropanol, and ethanol, with water, or without water.

D. The Applicator.

The kit can comprise as an optional component, one or more applicators or implements. The applicator(s) or implement(s) can be used to carry out any of the steps of the process, including, but not limited to: (a) applying a cleaning solution to the surface of a vehicle; (b) optionally contacting the surface of the vehicle with the cleaning solution thereon and agitating the cleaning solution to loosen dirt on the surface of the vehicle; (c) rinsing the surface of the vehicle to remove at least some of the cleaning solution; (d) rinsing the surface of the vehicle with purifed rinse water; and (e) applying a treating composition to the surface of the vehicle.

The applicators or implements can comprise any type of applicator or implement known in the art, including, but not limited to: a sprayer, a sponge, a fabric or porous article, or a squeegee to name a few possible types of applicators and implements. All types and configurations of these applicators and implements can be used. In the embodiment of the kit shown in the drawings, the applicator comprises a squeegee of the type having a foam pad. In a preferred embodiment, the treating composition is applied to the surface to be treated using a sprayer. The sprayer can be any suitable type of sprayer. Such a sprayer can be a diluting type, or the treating composition can be previously diluted placed into the container of the sprayer. In one preferred embodiment, the sprayer is a Solo SPRAYSTAR™ electrical sprayer such as that distributed by Solo Incorporated of Newport News, Va., USA. In other embodiments, the applicator can comprise an air gun.

E. Instructions for Use.

The kit may further comprise instructions for use. Such instructions for use may, for example, include instructions that instruct the user to spray on the treating composition using one pass with a sprayer. The instructions may further instruct the user to completely wet the surface of the surface without delaying the spray over any portion of the surface of the vehicle, or any other instructions necessary to form the desired coating.

III. The Method.

In one non-limiting embodiment, the method comprises a method for cleaning and treating a surface of a vehicle. The term "vehicle", as used herein, includes any type of vehicle known, and includes, but is not limited to automobiles, trucks, trains, aircraft, and watercraft. It should be understood that the method described below is merely illustrative. The surfaces of vehicles are illustrated because they often include cured painted surfaces, cured clearcoat surfaces, and glass surfaces, and various combinations of these different types of surfaces. Such surfaces are often some of the most unforgiving types of surfaces from the standpoint of their tendency to be left with visible watermarks and other types of residue. Thus, if the present method works well on such surfaces, it will generally work well on the other types of surfaces specified herein. The present invention can be used to clean and treat many other types of surfaces other than the surfaces of vehicles. The present invention is also not limited to the steps of the method described herein. In this embodiment, the method comprises the following steps.

A. Applying the Cleaning Solution to the Surface of a Vehicle.

The cleaning composition can be applied to the surface in any suitable manner. The cleaning composition can either be applied directly to the surface, with or without any other steps. In one non-limiting embodiment, however, the cleaning composition is applied to the surface after an optional pre-wetting step. The composition can be applied using a cloth or sponge onto which the composition has been applied, or by pouring the composition over the surface. Alternatively, the composition may be applied to the surface by spraying the composition onto the surface using a spraying device. In one non-limiting embodiment, a spraying device, such as the sprayer shown in the drawings, is used to apply the cleaning composition to the surface of the vehicle.

B. Contacting the Surface of the Vehicle with the Cleaning Solution Thereon and Agitating the Cleaning Solution to Loosen Dirt on the Surface of the Vehicle.

The surface of the vehicle with the cleaning solution thereon can be contacted to agitate or scrub the cleaning solution to loosen dirt on the surface of the vehicle. This can be done in any manner known in the art. In one non-limiting embodiment, a sponge is used to wipe the surface of the vehicle and agitate the cleaning solution to loosen dirt on the surface of the vehicle.

C. Rinsing the Surface of the Vehicle to Remove at Least Some of the Cleaning Solution.

Once the cleaning composition has been applied to the surface, the surface is then rinsed. The surface of the vehicle rinsed to remove at least some, and preferably substantially all of the cleaning solution (other than any portion of the cleaning solution which is desirable to leave on the surface to provide a hydrophilic properties). The surface of the vehicle can be rinsed in any manner known in the art, including but not limited to by using a hose. In one non-limiting embodiment, the surface of the vehicle is rinsed using a spraying device, such as the sprayer shown in the drawings. The spraying device can be set on the "normal rinse" setting and rinsed with tap water. Preferably, however, during at least some stage of the method, purified rinse water is used to reduce any residue left by tap water.

D. At Least Partially Removing any Residue-Forming Substances Remaining on the Surface of the Vehicle.

After the surface is washed and rinsed, any residue-forming substances remaining on the surface of the vehicle should be removed. Residue-forming substances include, but are not limited to: soap; any portion of the cleaning composition that will leave a residue, and is not intended to be left on the surface of the vehicle; and, dissolved solids that are left behind by rinsing the surface with tap water. The residue-forming substances can be removed in any suitable manner, including but not limited to towel-drying, by forced air drying the surface of the vehicle and rinsing the surface of the vehicle with purified rinse water, and by using an implement such as a brush or squeegee to remove excess water from the car.

1. Towel-Drying or Forced Air-Drying the Surface of the Vehicle.

The surface of the vehicle can be wiped dry (e.g., towel dried) or forced air dried in a conventional manner. Towel-drying, however, is labor intensive, and thus, may be less preferred. In a car wash, or other commercial version of the process, any tap water remaining on the surface of the vehicle, and its accompanying dissolved solids, can be removed by forced air drying of the surface of the vehicle. Forced air drying can also be adapted for a hand washing procedure.

2. Rinsing the Surface of the Vehicle with Purifed Rinse Water.

Alternatively, and preferably, at least some to all of the residue-forming substances are removed from the surface of the vehicle by rinsing the surface of the vehicle with purified rinse water. By "purified rinse water", it is meant water from which at least some suspended and/or dissolved solids (cations and anions) and other contaminants (organic and inorganic) or impurities have been removed, preferably using a filtering/ion exchange process.

The final rinse of purified rinse water can be delivered by any suitable means but is preferably, for convenience, delivered to the surface using a hose-end spray device. In one non-limiting embodiment, the surface of the vehicle is rinsed using a spraying device, such as the sprayer shown in the drawings. The spraying device can be set on the "purified rinse" setting and rinsed with purified water. In order to reduce the amount of purified water needed and to reduce the amount of capacity of the filter required to purify the water, the majority of the cleaning composition is preferably rinsed from the surface using unpurified water and then subsequently the surface is finally rinsed with purified rinse water.

In certain embodiments, an unusual phenomena is seen when rinsing the surface of the vehicle with purified rinse water. During the step of rinsing the surface of the vehicle with purified rinse water, a large number (e.g., a plurality or multiplicity) of small air bubbles or water droplets (either of which may be referred to herein as "beads") appear on the surface of the vehicle. These air bubbles or water droplets continuously form over the entire surface of the vehicle which is contacted with the purified rinse water and continuously sheet off the surface during the step of rinsing the surface of the vehicle with purified rinse water.

A particular benefit of using purified rinse water in the process is that when the surface is cleaned and then rinsed using purified rinse water, there is no need to wipe the surface dry or to use forced air to dry the surface. The surface rinsed with purified rinse water will be substantially free of water spots or streaks. This makes the use of purified rinse water in the method particularly advantageous for hand washing vehicles, since it is much less labor-intensive and energy-intensive than towel drying and forced air drying, respectively.

In an alternative embodiment, any of the polymers described herein can be added to the normal rinse water, the purified rinse water, or both. Incorporating the polymers into the rinse water may be used to provide the desired durable hydrophilic coating on the surfaces of the vehicle as an alternative to using the nanoparticle treating composition described in the following sections. Alternatively, the polymer material may be incorporated into the rinse water to assist in the attachment of the nanoparticles to the surfaces to be treated.

E. Applying a Treating Composition Comprising an Effective Amount of Non-Photoactive Nanoparticles to the Surface of the Vehicle.

The treating (or coating) composition comprising the non-photoactive nanoparticles is then applied to the surface of the vehicle. The treating composition can be applied to the surface of the vehicle while the vehicle is still wet from the purified rinse water, or when the surface of the vehicle is dry. The treating composition can be applied to the surface of the vehicle in any suitable manner including, but not limited to pouring, wiping (such as with a sponge, cloth, or the like), and spraying.

In a preferred embodiment, the aqueous liquid treating composition comprising the non-photoactive nanoparticles should first be shaken to ensure that the nanoparticles are adequately dispersed in the solution before it is applied to the surface of the vehicle.

It has been found that the properties of the treating composition and the manner of applying the treating composition can have a considerable impact on the final appearance of the vehicle. It is not trivial to deliver a residue-free nanoparticle film that provides the desired hydrophilic surface modification. This is particularly true in the case of certain conditions. For example, hot weather conditions can cause the treating composition to partially dry before it spreads sufficiently to form the desired coating. Direct sunlight can also impact the coating formed. Wind can affect the coating by creating unevenness in the coating where the coating is disturbed by the wind. In addition, the manner of application such as the manner and amount of the coating composition that is applied can have a significant impact on the final appearance of the vehicle. It is, therefore, desirable to develop a treating composition that is not overly sensitive to these conditions, and to apply the treating composition in a manner that forms a residue-free nanoparticle film that provides the desired hydrophilic surface modification.

It has been found that when the treating composition comprises LAPONITE B™ nanoparticles, it is capable of providing a more uniform coating (that is, more continuous, i.e., less openings in the way the coating forms after drying), and can provide a more substantive (or durable) coating than some of the other grades of LAPONITE™ by themselves (such as LAPONITE RD™). The coating preferably forms at least one layer of nanoparticles on the surface which has been coated, and is substantially uniform.

It has also been found that when the treating composition comprises certain surfactants, a more suitable coating is formed than when using other surfactants. The coating formed thereby is much less effected by the weather conditions. The use of the preferred types of surfactants described herein, such as MIN-FOAM™ surfactant, also provides a suitable surface coating using using a much lesser amount of non-photoactive nanoparticles, as well as a lesser amount of the sufactant. The reduction in the amount of non-photoactive nanoparticles may approach one-half of the amount of non-photoactive nanoparticles that must be used with other types of surfactants. The MIN-FOAM™ surfactant uses up to 15% less surfactant to deliver the LAPONITE B™ to the surface. Without wishing to be bound to any particular theory, this is believed to be due to the low CMC of the MIN-FOAM™ surfactant. Additionally, the MIN-FOAM™ surfactant produces less visible residue due to lower suds generating when the composition is delivered to the substrate using a sprayer. However, certain types of sprayers, including, but not limited to electrostatic sprayers, may cause fewer suds or bubbles to be introduced into the treating composition during application to the surface, which form suitable coatings with less visible residue under a wider variety of conditions.

In one non-limiting embodiment, the treating composition is applied directly to the surface of the vehicle using a cloth, sponge, or foam squeegee. A treating composition comprising about 0.055% of nanoparticles can be applied directly to the surface of the vehicle in this manner. The painted surfaces and windows of an average size car can be coated with approximately 1 L to 1.5 L of such a treating composition.

In another non-limiting embodiment, the treating composition is sprayed onto the surface of the vehicle. The treating composition can be applied using a spraying device, such as the sprayer shown in the drawings. The spraying device can be set on the "finishing coating" setting. Alternatively, a separate sprayer can be used. The treating composition may be sprayed onto the surface of the vehicle at a flow rate that is less than or equal to about 8 gal./min. (about 30 L/min) for hose-end type sprayers, or any flow rate less than that flow rate and all such spray rates, including, but not limited to less than or equal to about 0.1 gal./min. (about 0.38 L/min.), or less than or equal to about 0.05 gal./min. (about 0.19 L/min.) are incorporated herein. It has been found that the typically organic-based painted and/or clear coat-coated surfaces together with the windows of an average size car can be coated with approximately 1 L to 1.5 L of such a coating composition using a spraying method.

F. Forming a Wet Film of Nanoparticles.

The preceding step preferably forms a substantially uniform wet aqueous film comprising a plurality of nanoparticles, on the surface of the vehicle. Uniform coverage of the surface is desired in order to provide the benefits described herein to the entire surface to be treated.

The wet film should be capable of drying to a dry state. Between the wet state and the dry state, the film will typically pass through various partially dried states. In order to form a dry film that has the desired uniform characteristics described herein, the wet film should be as free as possible from film imperfection-producing substances. Therefore, a step in the process may include at least partially removing imperfection-producing substances from the surface to be coated and from the wet film. Such imperfection-producing substances may include, but are not limited to deposits which can be left by tap water, air bubbles, etc. The wet film should preferably be spread uniformly across the surface, and should not develop breaks in the uniformity during the drying process.

Air bubbles in the wet film can, in certain circumstances, cause serious defects in the finally-formed dry film. In certain embodiments, it is desirable for the wet film to have less than 61 (or less than or equal to 60) defects that are greater than or equal to 1.75 mm in width per 100 cm$^2$ of the surface as measured at any time more than 30 seconds after the wet film is formed on the surface. If the air bubbles are of a relatively small size (e.g., in some cases having a mean size less than or equal to about 4 mm (e.g. 3.75 mm)) or there are a limited number of bubbles of a size greater than or equal to about 1.75 mm, or if they break while the wet film is still in a partially dried state, this can minimize defects in the dry film. When air bubbles break when the wet film is still in a sufficiently early partially dried state, the adjacent portions of the wet film can flow into the openings created when the air bubbles break, and fill the same to eliminate any gaps in the dry film. Therefore, the wet film is preferably substantially free of air bubbles that break after the wet film is in a partially dried state. For this reason, it is desirable, when spraying the coating composition on the surfaces, to select a type of sprayer that will minimize the quantity and size of air bubbles in the wet film.

G. Allowing the Treating Composition to Dry on the Surface of the Vehicle Before the Surface of the Vehicle is Contacted by Water to Form a Dry Film on the Surface of the Vehicle.

The surface of the vehicle with the treating composition thereon should preferably be allowed to dry after the application of the treating composition. The surface should be allowed to dry without agitation, scrubbing, buffing, or otherwise disturbing the treated surface (that is, the wet film). The wet film on the surface of the vehicle should be allowed to dry for at least about 15 minutes, preferably at least about one-half hour, more preferably at least about 2 hours, more preferably still at least about 4 hours, and most preferably up to about 24 hours before any water contacts the treated surface of the vehicle.

After drying, the coating composition forms a dry film on the surface of the vehicle. The coating preferably forms a dry film comprising at least one layer of nanoparticles on the surface which has been coated, and is substantially uniform. Preferably, the dry film comprises primarily nanoparticles, and some remaining amounts of water and, in some cases, surfactant. The dry film can have any suitable amount of nanoparticles therein. Preferably, the dry film has a sufficient amount of nanoparticles to provide the surface of the vehicle with the desired hydrophilicity. Preferably, the dry film comprises non-photoactive nanoparticles in an amount greater than or equal to about 0.2 $\mu g/cm^2$ of the surface area treated. In certain embodiments, the dry film comprises less than 3 $\mu g/cm^2$ of non-photoactive nanoparticles relative to the area of the surface treated for a residue-free appearance. In certain embodiments, if the coating film comprises other materials, such as a binder material, the amount of binder material in the coating film may be less than a functional level of binder material. In certain embodiments, if the coating film comprises a peptizer, the amount of peptizer may be less than 3%. The term "peptizer", as used herein, includes, but is not limited to sodium tripolyphosphate, sodium orthophosphate, tetrasodium pyrophosphate. The dry film can provide the composite surface (or coated surface) with any suitable degree of hydrophilicity described herein. In preferred embodiments, the contact angle of distilled water on the dry film is less than or equal to about 50°, or less than or equal to any number of degrees less than 50° (including, but not limited to less than, or less than or equal to, about 35°, 25°, 20°, 15°, etc.).

It is often desirable for the dry film to be as defect-free as possible. In certain preferred embodiments, the dry film may have visual scores under the Visual Grading Test in the Test Methods section of greater than or equal to −2. Preferably, the dry film has a thickness of less than, or less than or equal to, about 400 nm, or less than, or less than or equal to, any number of nanometers less than 400, including, but not limited to 300, 200, etc. The thinner dry films will typically have better transparency.

Figure 4:
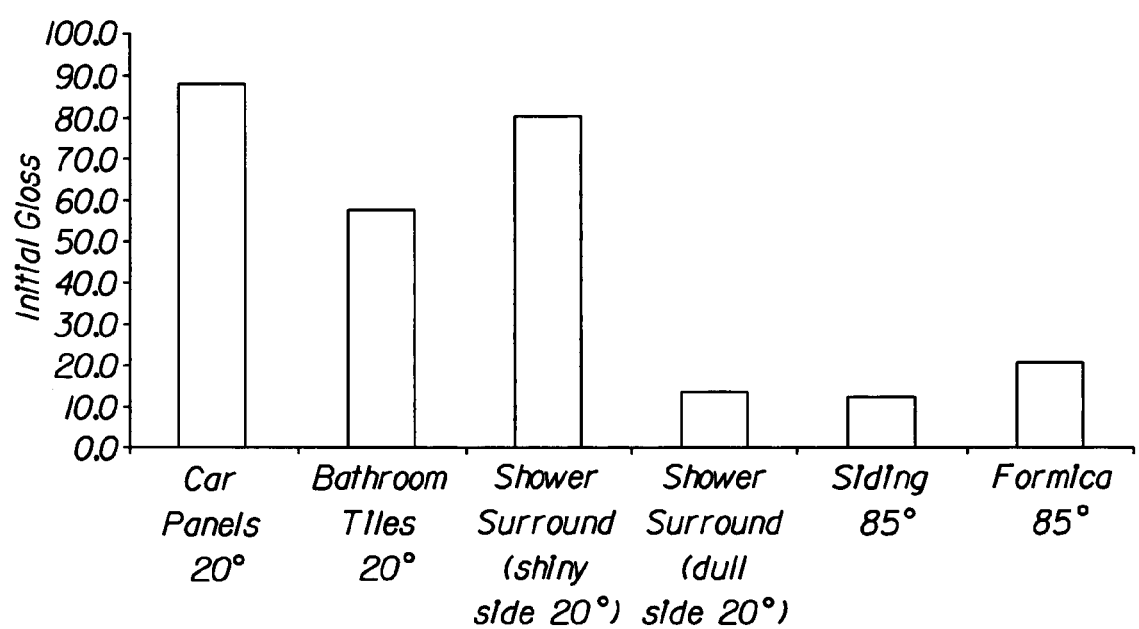
FIG. 4 is a graph showing the initial gloss of several surfaces before being treated with a composition comprising LAPONITE B® synthetic layered silicate.
Figure 5:
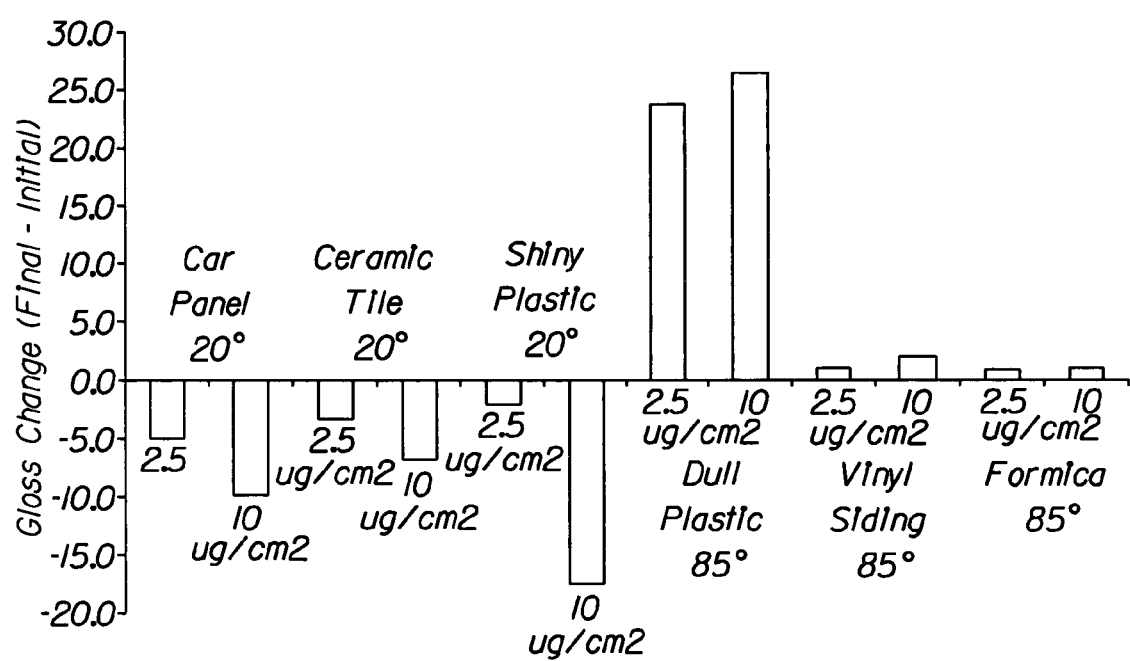
FIG. 5 is a graph showing the specular gloss change of these surfaces after being treated with a composition comprising LAPONITE B® synthetic layered silicate where the gloss change is shown in terms of change in specular gloss value.
Figure 6:
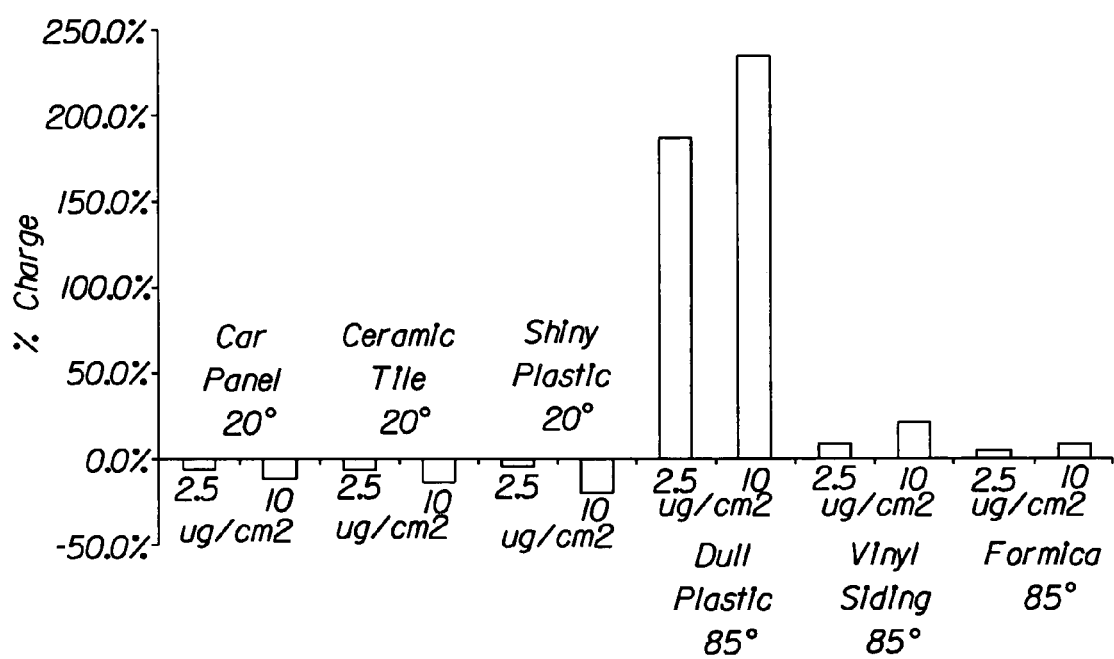
FIG. 6 is graph showing the specular gloss change of these surfaces after being treated with a composition comprising LAPONITE B® synthetic layered silicate where the gloss change is shown in terms of percentage change in specular gloss value.

In certain non-limiting embodiments, the treating composition enhances the gloss of surfaces that are initially dull, preferably by at least about 10%. In the case of surfaces that have a high initial gloss, in certain embodiments, the treating composition may either maintain or enhance the initial gloss, or does not cause more than a 10% reduction in the gloss. For example, surfaces with an initial gloss reading at 60° geoemetry of greater than or equal to 10 are preferably treated with a treating composition which results in less than 10% reduction of specular gloss value after treatment. Surfaces with an initial gloss reading at 60° geometry of less than 10 are preferably treated with a treating composition which results in greater than 10% increase of specular gloss value after treatment. FIG. 4 shows the initial gloss of several surfaces before being treated with a composition comprising LAPONITE B®. FIGS. 5 and 6 show examples that might represent the specular gloss change of these surfaces after being treated with a composition comprising LAPONITE B® where the gloss change is shown in terms of change in specular gloss value and percentage change in gloss, respectively.

The system and method of the present invention is well suited for use by consumers in hand washing and finishing automobiles. In such a case, the coating composition will typically be applied to the surfaces of the vehicle by spraying of the coating composition in a sequential manner onto limited areas or regions of the surfaces (or by applying the coating composition onto such limited areas of the surface by other means) until the entire surface of the vehicle is covered. The system and method of the present invention, in certain embodiments, provides a durable, transparent, residue-free, hydrophilic nanoparticle film coating that covers the entire surface of the car (or any desired portions thereof). The film coating, in certain embodiments, is not subject to spotting after being contacted repeatedly with water (such as rain water). In certain embodiments, there is no need to wax (and buff) vehicles that are treated by this method. In addition, the system and method of the present invention can be adapted to be used in commercial operations, including but not limited to car washes. The system and method may also be used to provide at least a temporary coating on new and other vehicles for shipment from the manufacturer to their final destination.

EXAMPLE(S)

The following provides several non-limiting examples of the present invention.

Examples 1-30

Liquid coating compositions, according to the present invention, are as follows where the balance is purified water:

TABLE 1

| Example # | Nanoparticle (Wt %) | Surfactant (Wt %) |
|---|---|---|
| 1 | Nanoclay[1] (0.055) | Minfoam 1× (0.042) |
| 2 | Nanoclay (0.1) | Minfoam 1× (0.075) |
| 3 | Nanoclay (0.1) | Minfoam 2× (0.075) |
| 4 | Nanoclay (0.1) | Minfoam 2× (0.03) |
|   |   | Minfoam 1× (0.03) |
| 5 | Nanoclay (0.1) | Neodol 91-6 (0.075) |
| 6 | Nanoclay (0.05) | Neodol 91-6 (0.075) |
| 7 | Nanoclay (0.1) | Neodol 91-2.5 (0.075) |
| 8 | Nanoclay (0.1) | Neodol 91-5 (0.075) |
| 9 | Nanoclay (0.1) | Neodol 91-8 (0.075) |
| 10 | Nanoclay (0.05) | Silwet L-77 (0.025) |
| 11 | Nanoclay (0.1) | Q2-5211 (0.025) |
| 12 | Nanoclay (0.05) | Q2-5211 (0.025) |
| 13 | Nanoclay (0.03) | Q2-5211 (0.1) |
| 14 | Nanoclay (0.05) | Q2-5212 (0.05) |
| 15 | Nanoclay (0.1) | Q2-5212 (0.05) |
| 16 | Nanoclay (0.1) | Tergitol 15-S-3 (0.075) |
| 17 | Nanoclay (0.1) | Tergitol 15-S-7 (0.075) |
| 18 | Nanoclay (0.1) | Tergitol 15-S-9 (0.1) |
| 19 | Nanoclay (0.1) | Tergitol NP-9 (0.1) |
| 20 | Nanoclay (0.1) | Tergitol TMN-6 (0.075) |
| 21 | Nanoclay (0.1) | Neodol 91-8 (0.075) |
| 22 | Nanoclay (0.1) | Component A[2] (0.2) |
| 23 | Nanoclay (0.2) | Component A (0.2) |

TABLE 1-continued

| Example # | Nanoparticle (Wt %) | Surfactant (Wt %) |
|---|---|---|
| 24 | Nanoclay (0.1) | Component B[3] (0.2) |
| 25 | Nanoclay (0.1)[4] | Neodol 91-6 (0.075) |
| 26 | Disperal P2 ™ (0.1)[5] | Neodol 91-6 (0.075) |
| 27 | Nanoclay (0.1) | APG[6] (0.05) |
| 28 | Nanoclay (0.1) | Butyl capped poly(oxyalkylated) alcohol (0.075) |
| 29 | Nanoclay (0.1) | Ether capped poly(oxyalkylated) alcohol (0.075) |
| 30 | Nanoclay (0.1) | Minfoam 1x (0.06) Minfoam 2x (0.015) |

[1] Nanoclay can be any of the available synthetic hectorite clays, such as LAPONITE ™ available from Southern Clay Products, Inc. One preferred grade of LAPONITE ™ is LAPONITE B ™, a sodium magnesium lithium fluorosilicate.
[2] Component A is R8-C(O)N(CH3)—(CH2CH2O)sB, where R8 is a 6 to 20 carbon atom alkyl group, s is an integer from 2 to 45, and B is hydrogen.
[3] Component B is RN(CH3)2(CH2CH2O)sB, where R is a 6 to 20 carbon atom alkyl group, s is an integer from 2 to 45, and B is hydrogen.
[4] One preferred grade of LAPONITE ™ for this example is LAPONITE RD ™.
[5] Disperal P2 ™ is boehmite alumina from Condea, Inc.
[6] APG is alkly-polyglucoside.

TABLE 2

| Example # | Nanoparticle (Wt %) | Surfactant (Wt %) | Dispersant (Wt %) |
|---|---|---|---|
| 31 | Nanoclay (0.1) | Neodol 91-6 (0.075) | Polyacrylate 4500 MW (0.02) |
| 32 | Nanoclay (0.1) | Neodol 91-6 (0.075) | Poly (acrylic/maleic)[2] (0.02) |
| 33 | Nanoclay (0.1) | Neodol 91-6 (0.075) | Polyacrylate 2000 MW (0.02) |
| 34 | Nanoclay (0.1) | Neodol 91-6 (0.075) | STPP (0.02) |

[1] Nanoclay can be any of the available synthetic hectorite clays, such as LAPONITE B ™ from Southern Clay Products, Inc.
[2] MA:AA (maleic acid/acrylic acid) = 4:6, MW (molecular weight) = 11,000.

Examples 35-43

Liquid coating compositions, according to the present invention, where the balance is purified water, and where said coating composition can be applied to a surface, or optionally where the coating composition can be diluted with water to achieve a coating composition with 0.1% concentration of nanoparticles are as follows:

TABLE 3

| Example # | Nanoparticle (Wt %) | Surfactant (Wt %) | Dispersant (Wt %) |
|---|---|---|---|
| 35 | Nanoclay (0.55) | Minfoam 1x (0.42) | None |
| 36 | Nanoclay (1.6) | Q2-5211 (0.8) | None |
| 37 | Nanoclay (0.8) | Q2-5211 (0.4) | None |
| 38 | Nanoclay (0.8) | Neodol 91-6 (0.6) | None |
| 39 | Disperal P2 ™ (10) | Neodol 91-6 (7.5) | None |
| 40 | Nanoclay (5.0) | Neodol 91-6 (3.75) | Polyacrylate 4500 MW (1.0) |
| 41 | Nanoclay (5.0) | Neodol 91-6 (3.75) | Poly (acrylic/maleic)[3] (1.0) |
| 42 | Nanoclay (1.0) | Neodol 91-6 (0.75) | Polyacrylate 4500 MW (0.2) |
| 43 | Nanoclay (1.0) | Neodol 91-6 (0.75) | Polyacrylate 4500 MW (0.1) |

[1] Nanoclay can be any of the available synthetic hectorite clays, such as LAPONITE ™ available from Southern Clay Products, Inc.
[2] Disperal P2 ™ is boehmite alumina from Condea, Inc.
[3] MA:AA = 4:6, MW = 11,000.

In the following examples, dispersants are formulated with the nanoclay and surfactant to allow the coating composition to be made with tap water:

TABLE 4

Examples of cleaning compositions with the following ingredients added to purified water, are as follows:

| | Active % In Total Cleaning Composition | | |
|---|---|---|---|
| | Ex. 44A - No Polymer | Ex. 44B - Cleaning Composition With Rhodia DV6573 Copolymer Added | Ex. 44C - Cleaning Composition With Rhodia DV6573 Copolymer Added |
| $C_{10-16}$ NaAE$_{0.6}$S | 10.95 | 10.95 | 0 |
| $C_{10-16}$ Amine Oxide | 2.76 | 2.76 | 15 |
| $C_{11}E_9$ (Neodol 1-9) | 1.275 | 1.275 | 0 |
| Proxel GXL (Preservative) | 0.015 | 0.015 | 0.015 |
| Liquitint Green 101 (Colorant) | 0.005 | 0.005 | 0.005 |
| Perfume | 0.05 | 0.05 | 0.05 |
| $H_2SO_4$/NaOH (pH adjust) | 0.3 | 0.3 | 0.3 |
| Rhodia DV6573 Copolymer | 0 | 0.2 | 0.2 |

Test Methods

Unless otherwise stated, all tests are performed under standard laboratory conditions (50% humidity and at 73° F. (23° C.)).

Procedure for the Measurement of Specular Gloss of Surfaces

Surfaces to which this method is applicable include painted automotive panels, ceramic tiles, vinyl siding, acrylics, and other synthetic or natural hard surfaces for indoor and outdoor applications.

Procedure:
1. Clean surface: The surface to be tested is washed with 1% DAWN® dishwashing liquid (available from The Procter & Gamble Company of Cincinnati, Ohio, U.S.A.) solution and rinsed with deionized water prior to use.
2. Calibrate a Photovolt "G-3" Gloss meter (BYK-Gardner USA, Rivers Park II, 9104 Guilford Road, Columbia, Md. 21046, USA.) according to manufacturer's instructions and measure specular gloss of the surface at 60° geometry. If the gloss value is lower than 10 (e.g., for dull or matte surfaces), the 85° geometry should be used for comparisons. If the gloss value is $\geq 10$ and <70, inclusive (medium gloss surfaces), the 60° geometry should continue to be used. If it is greater than 70 (high gloss surfaces), the 20° geometry should be used. At least 3 readings are taken for each surface type at the applicable geometry.
3. If a coated surface is available, proceed to the next step. If the surface has not been coated, apply the nanoparticle solution to the surface and allow the specimen to air dry in a horizontal position (4 hr. minimum).
4. Once the surface is dry the gloss value is measured again to determine the change in specular gloss after treatment.

Analysis:
1. Calculate the mean initial (before treatment), and final (after treatment and drying) gloss values for each surface.
2. Determine the percent change in specular gloss after treatment:

$$100 \times \frac{\Delta Gloss}{Initial\ Gloss}$$

Count and Measure of Suds and Film Desirability Effect

A black 4×12 in. (approximately 10×30 cm) panel obtained from ACT Laboratories, Inc. (Hillsdale, Mich., USA) is washed with 0.2% DAWN® dishwashing liquid in deionized water and rinsed with deionized water and allowed to air-dry vertically. The treating composition is sprayed with a Solo Spraystar sprayer on panel at 5° angle from horizontal and from 6 inches (15 cm) away, once from top to bottom, until panel is thoroughly coated. The sprayer is rinsed with 50 mL deionized water between sprayings. A digital picture is then taken of the middle 4×4" (10.16×10.16 cm area (referred to as the 100 cm area) after 30 seconds (timed from completion of spraying). The picture is taken with an Olympus® Camedia D450ZOOM digital camera mounted on a support stand with a clamping arm approximately 18 in. (45.7 cm) above the panel.

Suds in the picture are counted using Media Cybernetics® ImagePro® Plus 4.0 software obtained from Media Cybernetics, Inc., 8484 Georgia Avenue, Suite 200, Silver Spring Md., 20910, USA. The software is used to calibrate the image to actual proportions by setting the number of pixels displaying the width of the panel equal to 10.16 cm. Spatial filtering tools are then used to enhance the image. Suds are then counted over the middle 4×4" area of the panel and each defect is measured according to the width of the defect. The size data is then transferred to a spreadsheet where it can be organized into size categories or bins in a histogram.

Spatial parameters of the image are set using the "Calibration" tool "Spatial" (under "Measure") by setting the width of the panel equal to 10.16 cm. An area of interest ("AOI") is then set from the "Edit" menu around the 10.16×10.16 cm area. Background noise is then removed with filters under the "Spatial Filtering" tab. Under the "Special" tab, "Sculpt" (2 passes at strength 10) filter is used to remove background lighting irregularities and "Erode" filter is used under the "Morphological" tab (2 passes of the "erode" filter at the "3×3 cross" setting) to enhance defects.

Distribution of bubble sizes is determined with the "Count and Measure Objects" feature. Under "Measurements to be Taken", "Size Width" is selected. Under "Options", "Smoothing"=100, "4 Connect", and Fill Holes are selected. Under "Count/Measure": "Automatic Dark Objects" is selected. After "Count" is performed, "Data to File" from the "File" menu is selected to transfer the defect size data into a spreadsheet.

The computer program is essentially "sieving" or categorizing the defects of various sizes. In the spreadsheet, 13 bins are created for the histogram. "Defect Size" reports center of range of each bin. Bin maximums (millimeters) are 0.1, 0.25, 0.5, 0.75, 1.0, 1.25, 1.5, 1.75, 2.0, 2.5, 5.0, 7.5, and 10.0. The center of each bin range is determined by the following:

"Defect Size" = $\frac{\text{bin maximum} - \text{previous bin maximum}}{2} + \text{previous bin maximum}$ The number of defects in the bins of a size greater than equal to 1.75 mm is determined.

Visual Grading Test

Six independent panelists grade the entire panel except for the lower 2 inches of the panel used in the foregoing test for visible negatives against an untreated control in a room simulating North American light at 12:00 pm (noon). Grading instructions are as follows:

Purpose: Observers are used to determine the effect of application methods on the desirability of the end result of a car finishing product.

Instructions:
1. The panelists are instructed to use light to look for irregularities on panel that would draw your attention as a negative if seen on their own car.
2. Rate desirability of panel appearance against the control (0) on the following scale:

0 = Same
−1 = Think it's slightly worse
−2 = Know it's a little worse
−3 = Definitely worse
−4 = Much worse 3. The panelists' gradations are then averaged.

The present invention is not limited to methods that include steps for both cleaning and treating surfaces. For instance, in another non-limiting example, the method of the present invention can comprise only the steps for treating the surface. Any portions or steps of the method described herein may comprise inventions in their own right without regard to the other steps described herein.

The disclosure of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the subject invention have been described, it will be obvious to those skilled in the art that various changes and modifications of the subject invention can be made without departing from the spirit and scope of the invention. It will be clear to those skilled in the art that various changes and modifications may be made without departing from the scope of the invention and the invention is not to be considered limited to the embodiments and examples that are described in the specification.

What is claimed is:

1. A method for cleaning a surface of a vehicle, said method comprising the steps of:
   (a) applying a cleaning solution to the surface of a vehicle with a hand-held hose-end sprayer device, said cleaning solution comprising a polymer which renders the surface hydrophulic; the hand-held hose-end sprayer device being connected to a hose and the hand-held hose-end sprayer device further encompasses a selector valve system which allows the user to select different settings including setting; which allows the cleaning solution to be sprayed, a setting which allows the tap water to be sprayed and a setting which allows the purified rinse water to be sprayed wherein the stern further comprises selecting a setting which allows the cleaning solution to be sprayed to the surface of the vehicle;
   (b) optionally agitating the cleaning solution after applying the cleaning solution to the surface of the vehicle to loosen dirt on the surface of the vehicle;
   (c) rinsing the surface of the vehicle with tap water to remove at least some of the cleaning solution by selecting a setting which allows the tap water to be sprayed to the surface of the vehicle;
   (d) at least partially removing at least some residue-forming substances remaining on the surface of the vehicle, if any residue-forming substances remain on the surface of the vehicle, by rinsing the surface of the vehicle with purified rinse water by selecting a setting which allows the purified rinse water to be sprayed to the surface of the vehicle.

2. A method for cleaning a surface of a vehicle, said method comprising the steps of:
   (a) applying a cleaning solution to the surface of a vehicle with a hand-held hose-end sprayer device, said cleaning solution comprising a polymer which renders the surface hydrophilic wherein said cleaning solution comprises at least one water-soluble or water dispersible copolymer comprising, in the form of polymerized units
      (1) at least one monomer compound of general formula I:

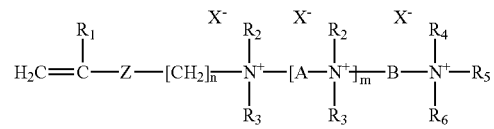

in which:
         $R_1$ is a hydrogen atom or a methyl or ethyl group;
         $R_2$, $R_3$, $R_4$, $R_5$ and $R_6$, which are identical or different, are linear or branched $C_1$-$C_6$;
         m is an integer from 0 to 10;
         n is an integer from 1 to 6;
         Z represents a —C(O)O— or —C(O)NH— group or an oxygen atom;
         A represents a $(CH_2)_p$ group, p being an integer from 1 to 6;
         B represents a linear or branched $C_2$-$C_{21}$ polymethylene chain optionally interrupted by one or more heteroatoms or heterogroups, and optionally substituted by one or more hydroxyl or amino groups;
         X, which are identical or different, represent counterions;
      (2) at least one hydrophilic monomer carrying an acidic functional group which is copolymerizable with (1);
      (3) optionally at least one monomer compound with ethylenic unsaturation with a neutral charge which is copolymerizable with (1) and (2); the hand-held hose-end sprayer device being connected to a hose and the hand-held hose-end sprayer device farther encompasses a selector valve system which allows the user to select different settings including a setting which allows the cleaning solution to be sprayed, a setting which allows the tap water to be sprayed and a setting which allows the purified rinse water to be sprayed; wherein the step further comprises selecting a setting which allows the cleaning solution to be sprayed to the surface of the vehicle;
   (b) optionally agitating the cleaning solution after applying the cleaning solution to the surface of the vehicle to loosen dirt on the surface of the vehicle;
   (c) rinsing the surface of the vehicle with tap water to remove at least some of the cleaning solution by selecting a setting which allows the tap water to be sprayed to the surface of the vehicle; and
   (d) at least partially removing at least some residue-forming substances remaining on the surface of the vehicle, if any residue-forming substances remain on the surface of the vehicle, by rinsing the surface of the vehicle with purified rinse water by selecting a setting which allows the purified rinse water to be sprayed to the surface of the vehicle.

3. The method of claim 2 wherein said at least one water-soluble or water dispersible copolymer is added to the rinse tap water used in step (c), to said purified rinse water used in step (d), or to both.

4. The method of claim 1 wherein said cleaning composition comprises a silicone surfactant.

5. A method for cleaning a surface of a vehicle, said method comprising the steps of:
- (a) providing a spray device that is configured to be connected to the end of a garden hose and held by a user's band, wherein said spray device comprises: a compartment containing a cleaning solution; a water purifier; and a valve system having settings for a washing step, a unpurified water rinsing step, and a purified water rinsing step;
- (b) applying said cleaning solution to the surface of a vehicle using said spray device, said cleaning solution comprising a polymer which renders the surface hydrophilic;
- (c) optionally agitating the cleaning solution after applying the cleaning solution to the surface of the vehicle to loosen dirt on the surface of the vehicle;
- (d) rinsing the surface of the vehicle with tap water using the spray device with the valve system set on the unpurified rinse setting to remove at least some of the cleaning solution; and
- (e) at least partially removing at least some residue-forming substances remaining on the surface of the vehicle, if any residue-forming substances remain on the surface of the vehicle, by rinsing the surface of the vehicle with purified rinse water using the spray device with the valve system set on the purified rinse setting.

6. The method of claim 5 wherein said water purifier comprises a structure comprised of two cylindrical portions, each having axes, that are joined together along portions that are oriented in the direction of their axes.

7. The method of claim 6 wherein each of said cylindrical portions contains ion exchange resin, and one of said cylindrical portions contains an ion exchange resin containing strong acid cation ion exchange resin and the other cylindrical portion contains an ion exchange resin containing weak base anion ion exchange resin.

8. The method of claim 5 wherein during step (e), a plurality of beads appear on the surface of the vehicle and continuously sheet off the surface of the vehicle.

* * * * *